United States Patent [19]

Janik et al.

[11] Patent Number: 4,791,186

[45] Date of Patent: Dec. 13, 1988

[54] METHOD FOR PREPARING STORAGE STABLE, ONE PART CURABLE POLYORGANOSILOXANE COMPOSITIONS

[75] Inventors: Gloria Janik, Midland; Manuel Buentello, III, Thomas Township, Saginaw County, both of Mich.

[73] Assignee: Dow Corning Corporation, Midland, Mich.

[21] Appl. No.: 140,521

[22] Filed: Jan. 4, 1988

[51] Int. Cl.$^4$ ............................................. C08G 77/06
[52] U.S. Cl. ....................................... 528/15; 528/31; 528/32; 525/478
[58] Field of Search .......................... 528/15, 31, 32; 525/478

[56] References Cited

U.S. PATENT DOCUMENTS

| | | |
|---|---|---|
| 2,823,218 | 2/1958 | Speier . |
| 3,020,260 | 2/1962 | Nelson . |
| 3,159,601 | 12/1964 | Ashby . |
| 3,159,662 | 12/1964 | Ashby . |
| 3,188,299 | 6/1965 | Chalk . |
| 3,188,300 | 6/1965 | Chalk . |
| 3,192,181 | 6/1965 | Moore . |
| 3,220,972 | 11/1965 | Lamoreaux . |
| 3,344,111 | 9/1967 | Chalk . |
| 3,383,356 | 5/1968 | Nielsen . |
| 3,419,593 | 12/1968 | Willing . |
| 3,445,420 | 5/1969 | Kookootsedes . |
| 3,453,233 | 7/1969 | Flatt . |
| 3,453,234 | 7/1969 | Kookootsedes . |
| 3,532,649 | 10/1970 | Smith et al. . |
| 3,723,497 | 3/1973 | Baney . |
| 3,867,343 | 2/1975 | Garden . |
| 3,923,705 | 12/1975 | Smith . |
| 4,281,093 | 7/1981 | Garden . |
| 4,374,967 | 2/1983 | Brown et al. . |
| 4,584,361 | 4/1986 | Janik . |

Primary Examiner—Melvyn I. Marquis
Attorney, Agent, or Firm—Robert Spector

[57] ABSTRACT

The substantial and upredictable increases in viscosity and cure time observed during storage of curable organosiloxane compositions obtained by blending large quantities of the ingredients disclosed in U.S. Pat. No. 4,584,631 are reduced by blending to homogeniety a mixture comprising at least one member from the classes of organohydrogensiloxanes, platinum catalysts and platinum catalyst inhibitors disclosed in this patent and allowing the resultant mixture to age from 14 days to about 4 months before being combined with a vinyl-containing polymer to form one of said curable compositions.

6 Claims, No Drawings

METHOD FOR PREPARING STORAGE STABLE, ONE PART CURABLE POLYORGANOSILOXANE COMPOSITIONS

BACKGROUND OF THE INVENTION

1. Field of the Invention

This invention relates to storage stable polyorganosiloxane compositions. More particularly, this invention relates to a method for preparing one-part storage stable organosiloxane compositions curable by a platinum catalyzed hydrosilation reaction. The viscosity and the cure time of curable compositions prepared in accordance with the present method do not increase substantially during storage.

2. Description of the Prior Art

Polyorganosiloxane compositions that cure by means of a platinum catalyzed hydrosilation reaction to form silicone gels are disclosed, for example, in U.S. Pat. No. 3,020,260, issued to Nelson on Feb. 6, 1962, and in U.S. Pat. No. 4,374,967, issued to Brown, Lee and Maxson on Feb. 22, 1983.

The gels described by Nelson are obtained by reacting an organosiloxane containing two silicon-bonded hydrogen atoms per molecule with a vinyl-containing copolymer wherein the repeating units are of the formulae RViSiO, $R_2SiO$, and $CH_3R_2SiO_{0.5}$, R is methyl or phenyl and Vi represents vinyl.

The vinyl-containing copolymers disclosed by Brown et al. consist essentially of $(CH_3)_2SiO$, $(CH_3)_3SiO_{0.5}$ and $(CH_3)_2ViSiO_{0.5}$ units, where Vi represents vinyl, and are reacted with an organohydrogensiloxane having more than one silicon-bonded hydrogen atom per molecule. Brown et al. teach that known inhibitors for platinum catalyzed hydrosilation reactions can be added to increase the working time of catalyzed compositions by decreasing the rate at which these compositions cure at temperatures above about 100° C.

While known inhibitors will partially suppress the reactivity of catalyzed compositions containing both vinyl radicals and silicon-bonded hydrogen atoms, these compositions cannot be stored for extended time periods under ambient conditions without either undergoing a substantial increase in viscosity or the time required to form a cured solid gel. The viscosity of commercially useful one-part curable organosiloxane composition should not vary substantially during the period of several weeks that can elapse between the time the composition is prepared and the time at which it is desired to cure the composition. During this period the compositions are stored in locations where the ambient temperature may reach 40° C.

Inhibitors that have been disclosed as useful catalyst inhibitors for the compositions taught in the aforementioned Brown et al. patent include the aromatic heterocyclic nitrogen compounds, pyridazine, pyrazine, quinoline, 2,2'-biquinoline, bipyridine, aphthyridine, quinaldine, dialkyl formamides, thioamides, alkylthioureas and ethylene thiourea described in U.S. Pat. No. 3,188,299, issued June 8, 1965, the organophosphorus compounds described in U.S. Pat. No. 3,188,300, issued June 8, 1965, benzotriazole as described in U.S. Pat. No. 3,192,181, issued June 29, 1965, the nitrile compounds described in U.S. Pat. No. 3,344,111, issued Sept. 26, 1967, the halocarbons described in U.S. Pat. No. 3,383,356, issued May 14, 1968, the acetylenic compounds described in U.S. Pat. No. 3,445,420, issued May 20, 1969, the vinyl silazanes described in U.S. Pat. No. 3,453,233, issued July 1, 1969, the sulfoxide compounds described in U.S. Pat. No. 3,453,234, issued July 1, 1969, the stannous salts, mercuric salts and other salts described in U.S. Pat. No. 3,532,649, issued Oct. 6, 1970 and the cyclic polymethylvinylsiloxanes discussed in U.S. Pat. No. 3,923,705, issued Dec. 2, 1975.

The use of ammonia, amines, and other nitrogen-containing compounds as inhibitors for the platinum catalyzed reaction of silicon-bonded hydrogen atoms with silicon-bonded hydroxyl groups is taught in U.S. Pat. No. 3,867,343, issued to Garden on Feb. 18, 1975. U.S. Pat. No. 4,281,093, issued to Garden on July 28, 1981, discloses using these inhibitors for The reaction of SiH-containing polyorganosiloxanes with polyorganosiloxanes containing silicon-bonded vinyl or allyl groups. The catalysts for the reaction are organic complexes of platinum or rhodium.

U.S. Pat. No. 4,584,631, which issued to Janik and Lo on Apr. 22, 1986, discloses storage-stable one-part heat curable polyorganosiloxane composition consisting essentially of The product obtained by blending (A) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2=CH)SiO_{0.5}$ units; (B) an organohydrogensiloxane containing at least two silicon-bonded hydrogen atoms per molecule, no more than one silicon-bonded hydrogen per silicon atom and silicon-bonded organic radicals selected from the group consisting of alkyl containing from 1 to 6 carbon atoms per radical, phenyl and 3,3,3-trifluoropropyl, said organohydrogensiloxane providing from 0.7 to 1.2 silicon-bonded hydrogen per silicon-bonded vinyl radical present in said composition, (C) a platinum catalyst in an amount sufficient to promote the reaction of (A) and (B) in the absence of an ihibitor, and (D) a platinum catalyst inhibitor.

These compositions are characterized by the presence of a platinum catalyst inhibitor of the general formula $R^1_2NR^3NR^2_2$ or $R^4NH_2$ in an amount sufficient to impart long term storage stability to said composition at 40° C. without inhibiting the ability of the platinum catalyst to promote curing of the compositions at temperatures above about 80° C. catalytic activity of (C) at 135° C. In the foregoing formulae for the amines each $R^1$ is individually selected from the group consisting of alkyl radicals containing from 1 to 4 carbon atoms, $R^2$ is $R^1$ or hydrogen, $R^3$ represents an alkylene radical containing from 2 to 4 carbon atoms, and $R^4$ represents an alkyl radical containing from 2 to 4 carbon atoms.

The curable compositions disclosed in the aforementioned Janik and Lo patent are prepared by blending together all of ingreidents, including the vinyl-containing polyorganosiloxane identified as ingredient (A). The amine prevents the resultant composition from curing when stored for several months at temperatures up to about 70° C.

The present inventors found that when one-part curable compositions described in the Janik and Lo patent are prepared on a commercial scale by blending kilogram amounts of all the ingredients together using commercial scale mixing equipment the viscosity and the time required to cure the resultant curable compositions often increase substantially and unpredictably during storage at room temperature. These increases in viscosity and cure time are not observed when the curable compositions are prepared using laboratory scale equipment. The unpredictable variations in viscosity and cure time makes it difficult to prepare curable compositions with the consistant properties required for fabrication of commerically useful cured articles and gels from these compositions.

SUMMARY OF THE INVENTION

The present invention is based on the discovery that the undesirable increases in viscosity and cure time observed when large quantities of the ingredients disclosed in the aforementioned Janik and Lo patent are blended to form one-part curable compositions be reduced by blending to homogeniety a mixture comprising at least one member from the classes of organohydrogensiloxanes, platinum catalysts and platinum catalyst inhibitors disclosed in this patent and allowing the resultant mixture to age at least 14 days before being combined with a vinyl-containing polymer to form one of the curable compositions described in the Janik and Lo patent.

DETAILED DESCRIPTION OF THE INVENTION

The present invention provides an improved method for preparing one-part, heat curable organosiloxane composition, said method comprising blending to homogeniety (A) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2=CH)SiO_{0.5}$ units;

(B) an organohydrogensiloxane containing at least two silicon-bonded hydrogen atoms per molecule, no more than one silicon-bonded hydrogen per silicon atom and organic radicals selected from the group consisting of alkyl containing from 1 to 6 carbon atoms per radical, phenyl and 3,3,3-trifluoropropyl, where said organohydrogensiloxane provides from 0.7 to 1.2 silicon-bonded hydrogenatoms per silicon-bonded vinyl radical present in said composition;

(C) a platinum catalyst in an amount sufficient to promote the reaction of (A) and (B), and (D) a platinum catalyst inhibitor of the formula $R^1_2NR^3NR^2_2$ or $R^4NH_2$ in an amount sufficient to impart long term storage stability at temperatures of up to 70° C., where each $R^1$ is individually selected form the group consisting of alkyl radicals containing from 1 to 4 carbon atoms, $R^2$ is $R^1$ or hydrogen, $R^3$ represents an alkylene radical containing from 2 to 4 carbon atoms, and $R^4$ represents an alkyl radical containing from 2 to 4 carbon atoms, the improvement consisting essentially of the following sequence of steps:

(1) forming a homogeneous mixture of said organohydrogensiloxane, said platinum catalyst and said platinum catalyst inhibitor, (2) aging said mixture for a period of at least 14 days under ambient conditions and (3) combining the aged mixture with said organosiloxane copolymer to form said curable composition.

The novel feature of the present method is the blending together of all the reactive ingedients of the curable composition with the exception of the vinyl-containing organosiloxane copolymer, identified hereinabove as ingredient A, and allowing the resultant mixture to age for at least 14 days, preferably from 14 days to four weeks, under ambient conditions before combining the mixture with the organosiloxane copolymer. The curable composition corresponds to those claimed in the aforementioned Janik and Lo patent. Each of the ingredients of the curable composition will now be explained in detail.

The inhibitors of the present curable compositions exhibit the general formulae $R^1NR^3NR^2$ and $R^4NH_2$, where $R^1$, $R^2$, $R^3$, and $R^4$ are as defined hereinbefore. Preferably all of the $R^1$ and $R^2$ radicals are methyl, $R^3$ is ethylene and the inhibitor is N,N,N',N'-tetramethylethylenediamine. Using this preferred inhibitor, cure times of 20 minutes or less, preferably 15 minutes or less, are achieved at 135° C. and the compositions are stable for several months at 70° C. Other amines corresponding to the foregoing general formulae, such as 3-(N,N-dibutylamino)propylamine and n-butylamine will impart useful storage stability to the compositions of this invention, but sometimes to a lesser degree than the preferred inhibitor.

The concentration of inhibitor will affect the long-term storage stability of the composition and the time required to cure the composition at 135° C. Concentrations as low as 0.001 weight percent, based on the weight of the curable composition, are useful when the storage period is relatively short and a rapid cure is desired. Above a concentration of about 0.007 weight percent, based on the weight of the curable composition, the time required for preferred compositions to cure may increase to the extent that the composition is no longer commercially useful.

The optimum concentration of a particular inhibitor that will satisfy the requirements for a given end use application can readily be determined with a minimum of experimentation. For preferred compositions this range is typically from 0.0050 to 0.0060 part by weight per 100 parts of curable composition.

The amine inhibitors described in the aforementioned Janik and Lo patent have been found to be quite selective, and are effective in combination with a relatively small class of polyorganosiloxane compositions. This class includes some of the compositions described in the aforementioned U.S. Pat. No. 4,374,967 to Brown et al., issued on Feb. 22, 1983. The compositions of Brown et al. that can be stabilized using the present inhibitors consist essentially of (A) an organosiloxane copolymer consisting of from 80 to 96.5 mol % of $(CH_3)_2SiO$ units, from 2.0 to 10.0 mol % of $CH_3SiO_{1.5}$ units, from 1.25 to 6.0 mol % of $(CH_3)_3SiO_{0.5}$ units and from 0.25 to 4.0 mol % of $(CH_3)_2(CH_2=CH)SiO_{0.5}$ units, and (B) an organohydrogensiloxane containing an average of two silicon-bonded hydrogen atoms per molecule, no more than one hydrogen atom on any silicon atom and organic radicals selected from alkyl containing from 1 to 6 carbon atoms, phenyl and 3,3,3-trifluoropropyl. The concentration of organohydrogensiloxane is sufficient to provide from 0.7 to 1.2 silicon-bonded hydrogen atoms per vinyl radical present in polyorganosiloxane ingredient A.

Vinyl-containing organosiloxane copolymers corresponding to ingredient A are well known. Preparation of these copolymers is described in the examples of the aforementioned Brown et al. patent, which is incorporated herein in its entirety by reference as a teaching of vinyl-containing organosiloxane copolymers suitable for use in the present compositions. These copolymers can be prepared by cohydrolysis of the corresponding methylchlorosilanes in the presence of a suitable acid acceptor. The resultant mixture can then be reacted with the required amount of $(CH_3)_2(CH_2=CH)SiCl$ or a hydrolysis product thereof to form the polyorganosiloxane referred to as ingredient A.

Alternatively, ingredient A can be prepared by equilibration of the corresponding siloxane polymers in the presence of an equilibration catalyst such as potassium silanolate. This alternative method is usually the preferred one.

Preferred organosiloxane copolymers contain from 87 to 94 mol percent of dimethylsiloxane units, from 3 to 6 mol percent monomethylsiloxy units, from 2.5 to 5 mol percent of trimethylsiloxy units and from 0.5 to 1 mol percent of dimethylvinylsiloxy units.

In the presence of a platinum hydrosilation catalyst, the vinyl radicals in A will react with the organohydrogensiloxane B to form a cured gel-like material. Ingredient B contains at least two silicon-bonded hydrogen atoms per molecule that can be located on any of the silicon atoms of B. If only two silicon-bonded hydrogen atoms are present, they are preferably located at the terminal silicon atoms of a polydiorganosiloxane. The organic radicals present on B can be one or more of alkyl containing from one to six carbons, phenyl or 3,3,3-trifluoropropyl. To ensure compatibility of B with the other ingredients of the curable composition, the organic radicals are preferably methyl.

Preferred embodiments of ingredient B can include one or more methylhydrogensiloxane and/or dimethylhydrogensiloxy units in combination with trimethylsiloxy, $CH_3SiO_{1.5}$, dimethylsiloxane and/or $SiO_2$ units. One preferred embodiment of ingredient B is a dimethylhydrogensiloxy endblocked polydimethylsiloxane containing from 1 to 30 dimethylsiloxane units per molecule. A second preferred embodiment contains trimethylsiloxy, dimethylsiloxane and methylhydrogensiloxane units, and an average of from 4 to 20 silicon atoms per molecule.

The concentration of ingredient B is sufficient to provide from 0.7 to 1.2 silicon-bonded hydrogen atoms per vinyl radical present in Ingredient A. Below this range there are an insufficient number of hydrogen atoms to completely cure the composition, while above this range hydrogen gas may be generated during curing and/or storage of the composition.

The platinum catalyst (ingredient C) promotes the reaction of ingredients A and B. Any of the well-known platinum catalysts that are effective for catalyzing the reaction between silicon-bonded hydrogen atoms and ethylenically unsaturated radicals such as vinyl can be used in the curable compositions prepared in accordance with the present method. These catalysts include the chloroplatinic acid described in U.S. Pat. No. 2,823,218, issued Feb. 11, 1958, to Speier et al., and the reaction products of chloropatinic acid and organosilicon compounds described by Willing in U.S. Pat. No. 3,419,593, issued Dec. 31, 1968. Also applicable are the platinum hydrocarbon complexes shown in U.S. Pat. Nos. 3,159,601, issued Dec. 1, 1964, and 3,159,662, issued Dec. 1, 1964, both to Ashby, the platinum acetylacetonate shown in U.S. Pat. No. 3,723,497, issued Mar. 27, 1973 to Baney and the platinum alcoholate catalysts described by Lamoreaux in U.S. Pat. No. 3,220,972, issued Nov. 30, 1965.

For any particular platinum catalyst selected, the skilled practitioner will be able to readily determine an optimum amount to promote curing at a desired rate. Platinum catalysts have been used effectively in amounts sufficient to provide from about 0.1 to 40 parts by weight of platinum per million parts by weight of total formulation. The present inventors have found the platinum catalyst described in Example 1 of the patent to Willing, cited hereinbefore, to be particularly effective when employed so as to provide between 5 and 10 parts by weight of platinum per million parts by weight of the total formulation.

In accordance with the present method, curable compositions are prepared by blending the organohydrogensiloxane (ingredient B), platinum catalyst (ingredient C), and at least one of the catalyst inhibitors described in the aforementioned Janik and Lo patent (ingredient D) to form a homogeneous composition. The inhibitor allows the curable composition to be stored under ambient conditions for a period of several days up to several months, depending upon the type and concentration of inhibitor. This mixture is then aged under ambient conditions, typically a temperature of from 25° to about 30° C. and a relative hunmidity of from 20 to about 70 percent, for a period of at least 14 days. The aging period is preferably from 14 days to about four months. Beyond four months the curing time of some compositions may be above the preferred upper limit of 15 minutes.

Following completion of the aging period the mixture of ingredients B, C and D is combined with the vinyl-containing polymer (ingredient A) to form a curable composition of the type described in the aformentioned Janik and Lo patent.

When it is desired to cure a composition prepared in accordance with the present method, the composition is heated at temperature above about 80° C. until the desired degree of curing has been achieved. The heating period required to achieve this is preferably no longer than 15 minutes. It will be understood that the optimum curing conditions for a given composition will be determined by the ingredients of the composition, particularly the type of catalyst and catalyst inhibitor. The curing temperature for compositions containing the preferred N,N,N',N'-tetramethylethylenediamine inhibitor is from about 100° to about 150° C.

The extent to which a composition cures can readily be determined by measuring the distance to which a penetrometer probe of known weight penetrates into the gel during a specified period of time. For preferred cured compositions this value is from 3 to 7.5 mm. using a combined probe and plunger weight of 19.5 g. applied for five seconds.

A characteristic feature of some of the present compositions is the occurrence of a relatively small increase in viscosity during the first seven days of storage. The total increase amounts to about 10 percent of the initial viscosity. Following this initial increase the viscosity of the composition remains substantially constant throughout the remainder of the storage period, which can be up to ten months or longer.

The gels obtained by curing the polyorganosiloxane compositions of this invention are useful as potting compounds and conformal coatings. The compositions are particularly useful for encapsulating electronic circuit boards containing semiconductor devices that are susceptible to damage by moisture or other contaminants present at locations where the circuits are installed. The structural integrity of the gel is not adversely affected by temperatures as low as −120° C.

The following example demonstrates the advantages of the present method and the preparation of preferred curable compositions. All parts and percentages in the examples are by weight unless otherwise specified and viscosities were measured at 25° C.

EXAMPLE

This example demonstrates the criticality of the length of the aging period on the extent to which the viscosity and cure time of preferred curable compositions increase with the storage time of the composition.

The following ingredients were combined and blended to homogeniety:

96.9 parts of a dimethylhydrogensiloxy endblocked polydimethylsiloxane containing about 0.2 percent by weight of silicon-bonded hydrogen atoms (B), 3.0 parts of a reaction product of hexachloroplatinic acid and sym-tetramethyldivinyldisiloxane that had been diluted with a liquid dimethylsiloxy terminated polydimethylsiloxane in an amount sufficient to achieve a platinum content of 0.7 weight percent (C), and The amount of N,N,N',N'-tetramethylethylene diamine (D) specified in the following tables.

After aging for the period of time shown in the following tables, 5 parts of the mixture of ingredients B, C, and D was combined with 95 parts of an organosiloxane copolymer containing 92.7 mol percent dimethylsiloxane units, 0.9 mol percent dimethylvinylsiloxane units, 2.4 mol percent trimethylsiloxy units, 4.0 mol percent monomethylsiloxy units, and exhibiting a viscosity of $1 \times 10^5$ m$^2$/s. The viscosity and cure time of the resultant curable composition were measured on the initial composition and after the curable composition was stored at room temperature for one month.

The number in parentheses to the right of the value for the final cure time represents the time interval during which the curable composition was stored prior to obtaining the final cure time value. All of the compositions were cured by heating them in a bath of silicone oil maintained at a temperature of 135° C. until the composition cured. The time required for the composition to cure after being stored for one month is also recorded in the following tables.

TABLE 1

| | Mixture of Ingredients B, C, and D Not Aged (Comparison Example) | | | | | | |
|---|---|---|---|---|---|---|---|
| | Cure Time (Min.) | | | | Viscosity (Pa.s) | | |
| Ing. D (Wt. %) | Initial | 1 Mo. | change (%) | Final (mos.) | Initial | 1 mo. | change (%) |
| 0.0065* | 9.1 | 13.7 | +51 | 17.8 (4) | 0.81 | 0.97 | 20 |
| 0.0057 | 9.5 | 13.2 | +39 | 14.0 (5) | 0.88 | 1.25 | 40 |

TABLE 2

| | Mixture of Ingredients B, C, and D Aged For One Day (Comparison Example) | | | | | | |
|---|---|---|---|---|---|---|---|
| | Cure Time (Min.) | | | | Viscosity (Pa.s) | | |
| Ing. D (Wt. %) | Initial | 1 Mo. | change (%) | Final (mos.) | Initial | 1 mo. | change (%) |
| 0.0057 | 9.7 | 14.0 | +44 | 14.1 (5) | 0.77 | 1.00 | 30 |
| 0.0050 | 14.2 | 15.0 | +6 | 14.8 (4) | 0.76 | 0.84 | 11 |

TABLE 3

| | Mixture of Ingredients B, C, and D Aged for One Month | | | | | | |
|---|---|---|---|---|---|---|---|
| | Cure Time (Min.) | | | | Viscosity (Pa.s) | | |
| Ing. D (Wt. %) | Initial | 1 Mo. | change (%) | Final (mos.) | Initial | 1 mo. | change (%) |
| 0.0057 | 12.0 | 12.5 | +4 | 14.8 (4) | 0.71 | 0.89 | 25 |
| 0.0050 | 13.5 | 12.6 | −7 | 13.4 (3) | 0.86 | 1.01 | 17 |

TABLE 4

| | Mixture of Ingredients B, C, and D Aged For 3 Months | | | | | | |
|---|---|---|---|---|---|---|---|
| | Cure Time (Min.) | | | | Viscosity (Pa.s) | | |
| Ing. D (Wt. %) | Initial | 1 Mo. | change (%) | Final (mos.) | Initial | 1 mo. | change (%) |
| 0.0075 | 19.6 | 13.4 | −32 | 14.7 (5) | 0.72 | 0.83 | 15 |
| 0.0062 | 18.3 | 13.8 | −25 | 19.5 (7) | 0.78 | 0.75 | −4 |
| 0.0050 | 15.6 | 12.4 | −21 | 13.5 (5) | 0.72 | 0.80 | 11 |

TABLE 5

| | Mixture of Ingredients B, C, and D Aged For 5 Months* | | | | | | |
|---|---|---|---|---|---|---|---|
| | Cure Time (Min.) | | | | Viscosity (Pa.s) | | |
| Ing. D (Wt. %) | Initial | 1 Mo. | change (%) | Final (mos.) | Initial | 1 mo. | change (%) |
| 0.0075 | 19.0 | — | — | 19.6 (5) | 0.92 | 0.92 | 0 |
| 0.0062 | 18.9 | 18.6 | −2 | 18.9 (4) | 0.86 | 1.12 | 30 |
| 0.0050 | 19.8 | — | — | 28.9 (5) | 0.70 | 0.90 | 29 |

*Aging time is above preferred limit of four months.

Initial cure times for compositions wherein ingredients B, C, and D were aged for five months are all above the preferred upper limit of 15 minutes. The curing time for some compositions prepared in accordance with the present method actually decreased during storage.

That which is claimed is:

1. In a method for preparing a one-part, heat curable organosiloxane composition, said method comprising blending to homogeniety (A) at least one organosiloxane copolymer consisting essentially of from 80 to 96.5 mol percent of $(CH_3)_2SiO$ units, from 2.0 to 10.0 mol percent of $CH_3SiO_{1.5}$ units, from 1.25 to 6.0 mol percent of $(CH_3)_3SiO_{0.5}$ units and from 0.25 to 4.0 mol percent of $(CH_3)_2(CH_2=CH)SiO_{0.5}$ units;

(B) an organohydrogensiloxane containing at least two silicon-bonded hydrogen atoms per molecule, no more than one silicon-bonded hydrogen per silicon atom and organic radicals selected from the group consisting of alkyl containing from 1 to 6 carbon atoms per radical, phenyl and 3,3,3-trifluoropropyl, said organohydrogensiloxane providing from 0.7 to 1.2 silicon-bonded hydrogen atoms per silicon-bonded vinyl radical present in said composition;

(C) a platinum catalyst in an amount sufficient to promote the reaction of (A) and (B), and (D) a platinum catalyst inhibitor of the formula $R^1_2NR^3NR^2_2$ or $R^4NH_2$ in an amount sufficient to impart long term storage stability at temperatures of up to 70° C., where each $R^1$ is individually selected from alkyl radicals containing from 1 to 4 carbon atoms, $R^2$ is $R^1$ or hydrogen, $R^3$ represents an alkylene radical containing from 2 to 4 carbon atoms, and $R^4$ represents an alkyl radical containing from 2 to 4 carbon atoms, the improvement consisting essentially of the following sequence of steps:

(1) forming a homogeneous mixture of said organohydrogensiloxane, said platinum catalyst and said platinum catalyst inhibitor,
(2) aging said mixture for a period of at least 14 days under ambient conditions, and
(3) combining the aged mixture with said organosiloxane copolymer to form said curable composition.

2. A method according to claim 1 where all the $R^1$ and $R^2$ radicals are methyl and $R^3$ is ethylene, the concentration of inhibitor is sufficient to impart long term storage stability at 50° C. without impairing the ability of said composition to cure at temperatures of from 100° to 150° C., and the mixture of ingredients B, C and D is aged from 14 days to 4 months.

3. A method according to claim 1 where said platinum catalyst inhibitor is $(n-C_4H_9)_2NCH_2CH_2CH_2NH_2$.

4. A method according to claim 3 where the concentration of said platinum catalyst inhibitor is from 0.001 to 0.007 part by weight per 100 parts by weight of said composition.

5. A method according to claim 1 where said organosiloxane copolymer contains from 87 to 94 mol percent of $(CH_3)_2SiO$ units, from 3 to 6 mol percent of $CH_3SiO_{1.5}$ units, from 2.5 to 5 mol percent of $(CH_3)_3SiO_{0.5}$ units and from 0.5 to 1 mol percent of $(CH_3)_2(CH_2{=}CH)SiO_{0.5}$ units, and the concentration of said platinum catalyst inhibitor is from 0.0050 to 0.0060 percent by weight, based on the weight of said curable composition.

6. A method according to claim 4 where said organohydrogensiloxane is a dimethylhydrogensiloxy endblocked polydimethylsiloxane containing from 1 to 30 dimethylsiloxane units per molecule and said platinum catalyst is a reaction product of chloroplatinic acid with an organosilicon compound.

* * * * *